United States Patent [19]
Rheinheimer et al.

[11] Patent Number: 5,224,578
[45] Date of Patent: Jul. 6, 1993

[54] COOLANT FLOW CONTROL FOR A CLUTCH

[75] Inventors: Güenter Rheinheimer, Frankelbach; Helmut Schaefer, Ketsch, both of Fed. Rep. of Germany

[73] Assignee: Deere & Company, Moline, Ill.

[21] Appl. No.: 900,025

[22] Filed: Jun. 17, 1992

[30] Foreign Application Priority Data

Jun. 17, 1991 [DE] Fed. Rep. of Germany ....... 4119891

[51] Int. Cl.⁵ ..................... F16D 25/12; F16D 13/74
[52] U.S. Cl. ................................................. 192/113 B
[58] Field of Search ........................ 192/70.12, 113 B

[56] References Cited

U.S. PATENT DOCUMENTS

| | | |
|---|---|---|
| 3,351,169 | 11/1967 | McIndoe . |
| 3,995,727 | 12/1976 | Ivey .................... 192/113 B |
| 4,134,483 | 1/1979 | Horsch ............... 192/113 B |
| 4,147,242 | 4/1979 | Fujioka ................ 192/4 A |
| 4,157,750 | 6/1979 | Horsch ............... 192/113 B |
| 4,529,073 | 7/1985 | Lewis .................. 192/70.12 |
| 4,540,078 | 9/1985 | Wetrich ............ 192/113 B X |
| 4,557,363 | 12/1985 | Golan ............... 192/70.12 X |
| 4,640,401 | 2/1987 | Koltookian ........ 192/113 B X |
| 4,644,968 | 2/1987 | Chatterjea ........ 192/113 B X |
| 4,696,383 | 9/1987 | Aoki et al. .......... 192/70.12 |
| 4,753,332 | 6/1988 | Bieber et al. ....... 192/70.12 |
| 4,856,628 | 8/1989 | Momiyama ........ 192/113 B X |

FOREIGN PATENT DOCUMENTS

| | | |
|---|---|---|
| 0143314 | 6/1985 | European Pat. Off. . |
| 2318352 | 2/1977 | France . |
| 2225074 | 5/1990 | United Kingdom . |

Primary Examiner—Rodney H. Bonck

[57] ABSTRACT

The cooling of a hydraulically-operated wet clutch with coolant is primarily required during the slippage phase when the linings are heated by the slip, that is, when the torque transmitted by the clutch is less than the torque delivered by the engine. A coolant flow control is provided in which a coolant control valve is controlled in such a way that it interrupts the coolant flow to the clutch during operation with clutch engaged or disengaged and opens the coolant flow to the clutch during the engagement process of the clutch and, if required, for a predetermined time interval following the engagement process. However, the coolant control valve only opens the coolant flow to the clutch during the disengagement process if the slippage phase during disengagement lasts longer than a predetermined second time interval.

10 Claims, 6 Drawing Sheets

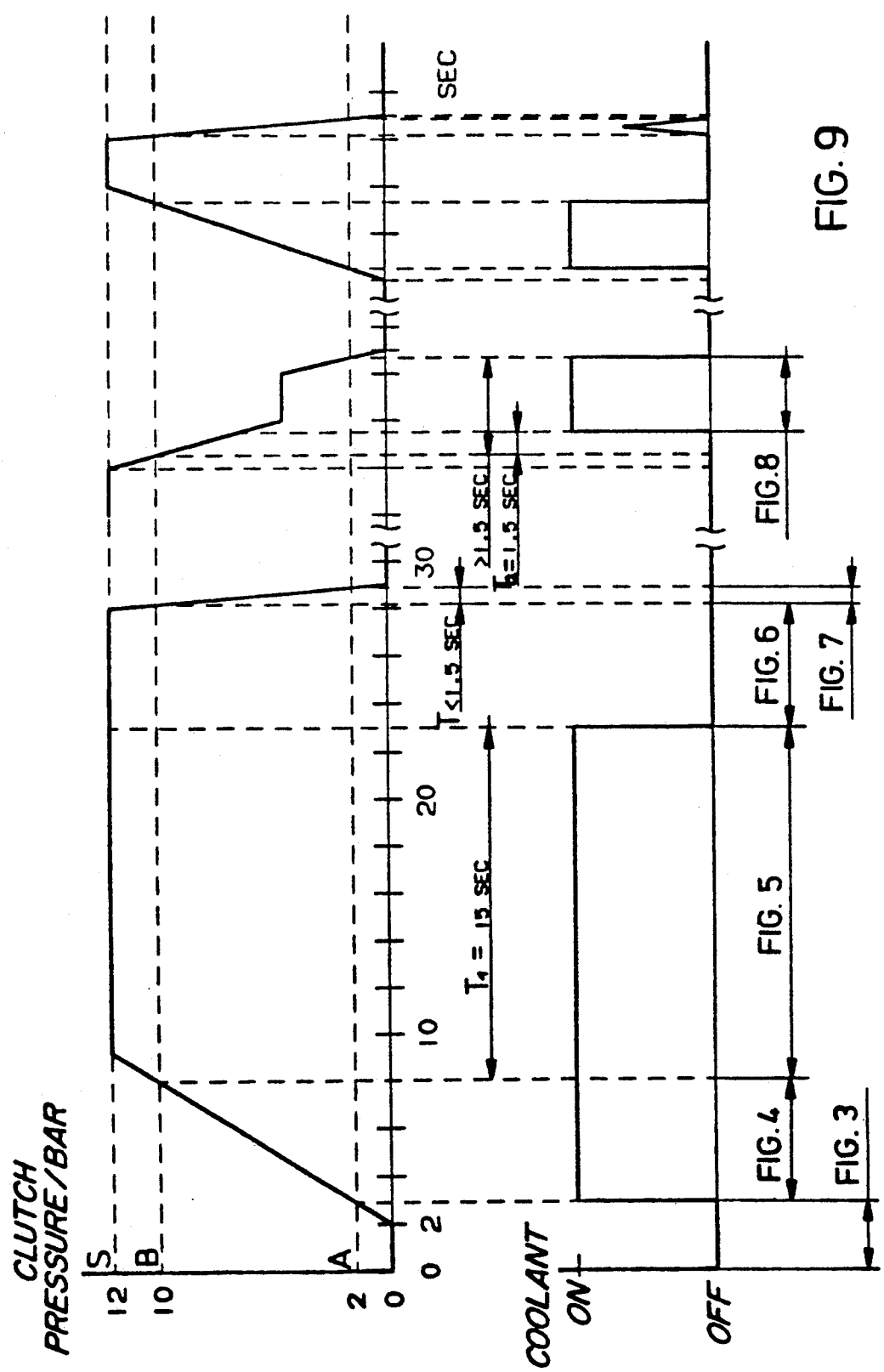

COOLANT FLOW CONTROL FOR A CLUTCH

BACKGROUND OF THE INVENTION

1. Field of the Invention

The invention concerns a coolant flow control for a clutch that can be hydraulically engaged and disengaged, and in particular, a coolant flow control system which can provide coolant flow to the clutch whenever the clutch is being engaged or disengaged and, if required, for a predetermined time interval following engagement of the clutch.

2. Description of the Related Art

Wet clutches for vehicles or power take-off shafts, such as are applied, for example, in agricultural and industrial vehicles, usually contain a hydraulically actuated piston which compresses a stack of clutch disks or plates. The clutch is engaged by friction locking, which generates heat. To avoid excessive wear, the clutch is cooled by a cooling fluid, for example, cooling oil, to transfer heat away from the clutch.

Such cooling of the clutch is primarily required during the slippage phase, when the clutch linings are heated by the slip friction, that is, when the torque transmitted by the clutch is less than the torque delivered by the engine. For example, the maximum input torque may be 65% of the rated torque of the clutch, depending upon the design of the clutch. As a first approximation, the torque transmitted by the clutch is proportional to the hydraulic piston pressure, hence slippage of the clutch will occur when the piston pressure is lower than approximately 65% of the hydraulic system pressure.

One coolant flow control system for clutches of this type is shown in EP-B1-0 143 314. In that system, the coolant flow control valve can be controlled relative to the actuation of the clutch such that cooling of the clutch disks occurs only during actuation of the clutch while engaging or disengaging, that is while the clutch is partially engaged. The control is so designed that during engagement, cooling persists after the end of the engaging process for a predetermined time interval to cool the heated clutch disks adequately. Upon disengagement of the clutch, cooling is initiated at the beginning of the disengaging process and is interrupted at the end of the disengaging process.

SUMMARY OF THE INVENTION

The object of the present invention is to provide a coolant flow control system of this type which is simple to manufacture at low cost and which assures the greatest possible operating safety. It is a further object of the invention to minimize the detrimental friction torques generated by coolant not completely ejected from the disks, which makes shifting of a following multi-speed gearbox unnecessarily difficult.

These objects are achieved according to the invention by providing a coolant flow control valve that provides coolant to the clutch for a first predetermined interval upon engagement of the clutch, but only provides coolant during the disengaging process if the disengaging process lasts longer than a second predetermined time interval. As a result, coolant is provided during engagement and during a slow disengagement process, but no coolant is provided when the clutch is disengaged rapidly.

Rapid clutch operations, such as those initiating the shifting of gears, clearly predominate in actual use. In such operations, the energy transfer is so low that no coolant supply is necessary. According to the invention, cooling therefore is deliberately prevented during rapid disengagements, so that the disengaged clutch is practically always free of coolant at the end of the disengagement process. The subsequent shifting process in the following multi-speed gearbox therefore is not impaired by friction torques due to excess coolant in the clutch, preventing difficult shifting and increased wear of the synchronizing rings. If, on the other hand, the clutch is disengaged slowly and coolant is needed, the clutch is provided with an assured supply of coolant to carry away the frictional energy.

The point of initial engagement/final disengagement of the clutch disks can be defined by a lower threshold value of the clutch piston pressure, which preferably lies between 10 and 20% of the clutch system pressure (the disengagement pressure). Similarly, the point of final engagement/initial disengagement can be defined by an upper threshold value, e.g., between 80 and 90% of the clutch system pressure. The clutch disks can be assumed to be slipping, and therefore generating heat, any time the system pressure is between these thresholds.

According to the invention, coolant flow is provided to the clutch upon engagement for a first predetermined interval starting when the clutch pressure exceeds the lower threshold value. The length of the predetermined interval is determined by how long a typical engagement process takes, plus the length of time coolant must be provided to cool the disks back down to normal temperatures. A typical interval would be in the range of 5 to 45 seconds, or preferably about 15 seconds.

In contrast, coolant flow is not provided to the clutch upon disengagement until the clutch pressure has stayed between the upper and lower thresholds for a second predetermined interval starting from when the pressure first falls below the upper threshold. The length of the second predetermined interval will depend on the cooling requirements of the disks and the normal time required for a shift in the associated multi-speed gearbox. A typical interval would be in the range of 0.5 to 3.0 seconds, or preferably about 1.5 seconds.

It should be noted that a significant advantage to the present invention is that clutch performance can be improved because, while coolant is provided in all critical operating conditions (longer slippage periods), it is not provided when it is not needed. Thus, only the absolutely necessary coolant flow is delivered to the clutch, and the capacity of the coolant supply system can therefore be kept relatively small.

Since very little frictional energy is transferred in the clutch when the pressure is near the disengagement pressure, it does not matter if cooling is started or cut off slightly above or below the disengagement pressure upon clutch engagement or disengagement. Accordingly, the valve may alternatively be set to open or close based on hydraulic pressures somewhat above or below the disengagement pressure, e.g., to make the start-up of the vehicle easier (early cooling) or to give the operator a precisely defined start-up point (late cooling).

Alternatively, the coolant flow control system can be controlled by the slippage torque of the clutch or values proportional thereto, such as clutch piston pressure or the position of the clutch piston, clutch valve, clutch pedal or intermediate actuating devices.

An electromagnetic valve, a pressure sensor and a control arrangement can be arranged according to advantageous embodiments of the invention in such a way that the pressure-dependent control position of a hydromechanical control valve and a hydromechanical pilot valve can be overridden, so that even at a pressure between the predetermined threshold values, the coolant supply to the clutch is interrupted or remains in effect above the upper threshold value. This allows follow-on cooling of the clutch disks when they already are fully engaged. Furthermore a secure supply of coolant to the clutch during slippage is then possible even if the electric or electronic components have failed, for example, when the vehicle is operated without a battery.

BRIEF DESCRIPTION OF THE DRAWINGS

The invention will be described further with reference to the following drawings, in which:

FIG. 9 shows the variation with time of the clutch piston pressure and of the coolant flow during actuation of the clutch.

DETAILED DESCRIPTION OF THE PREFERRED EMBODIMENTS

Figure 1:
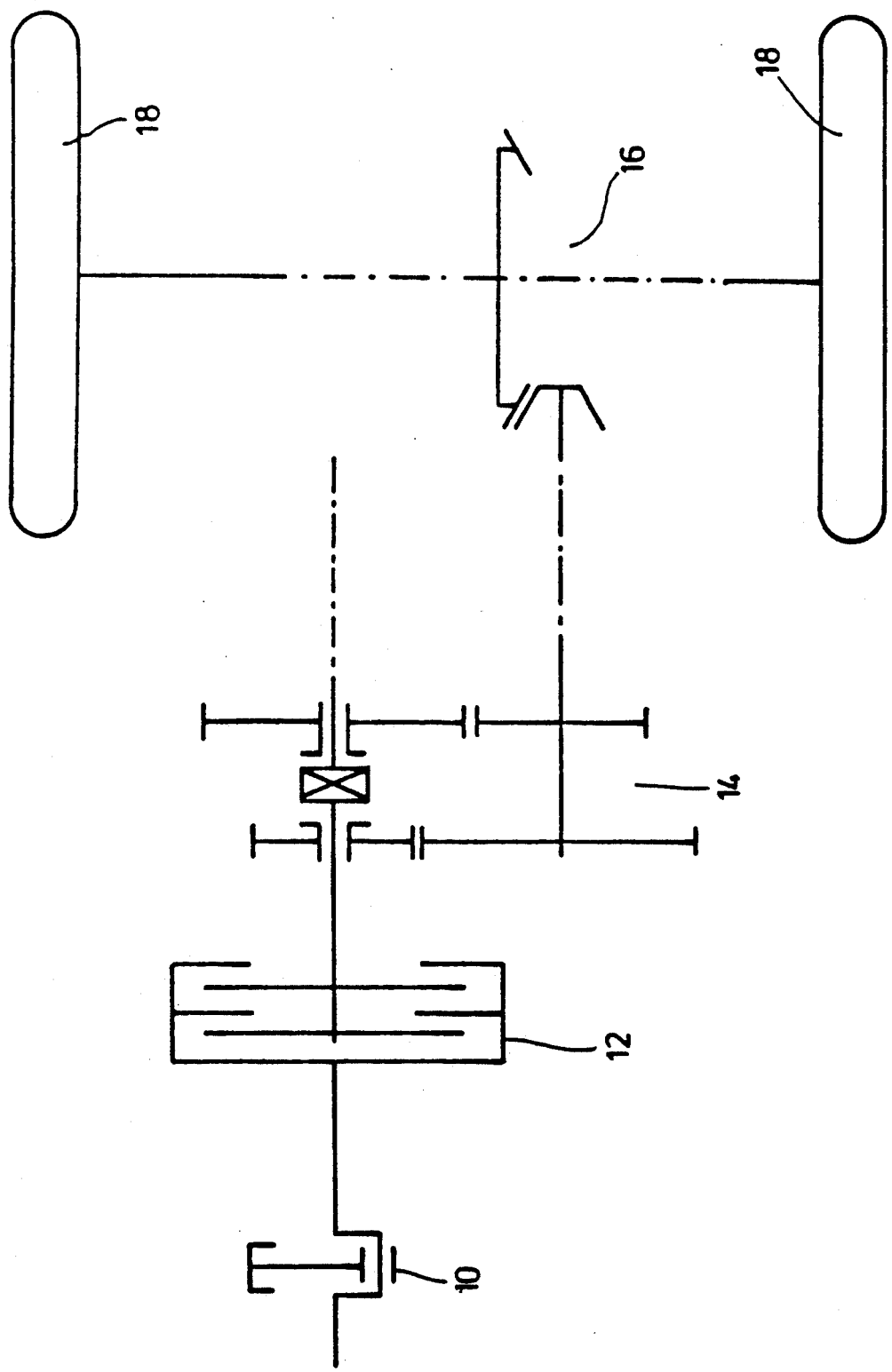
FIG. 1 shows a schematic view of a vehicle driveline.

FIG. 1 schematically illustrates the driveline of a vehicle that may, for example, be used in an agricultural tractor. Power is generated by an internal combustion engine 10, delivered through a wet clutch 12 to a synchronized multi-speed gearbox 14 and transmitted through a differential gearbox 16 to the drive wheels 18.

Figure 2:
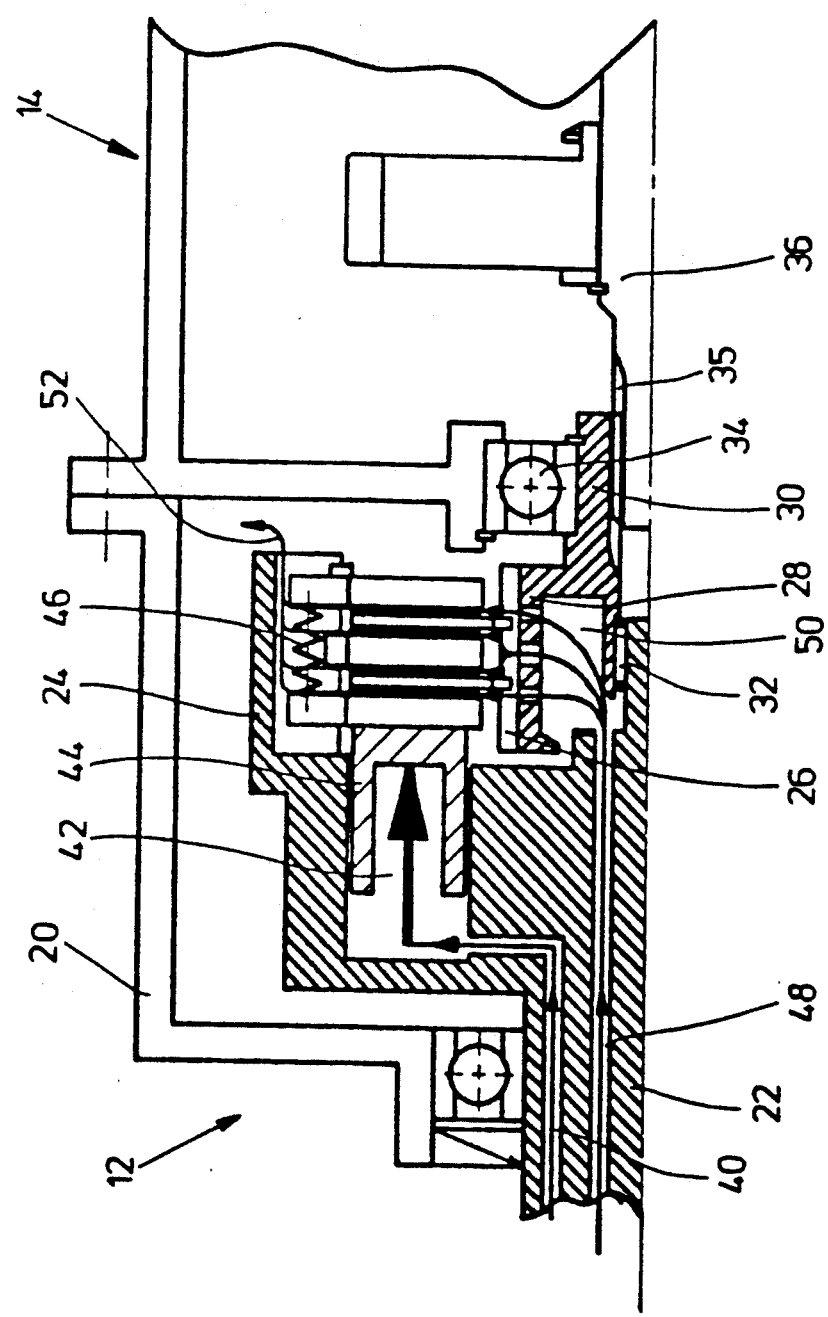
FIG. 2 shows a schematic cross section of a wet driveline clutch.

A more detailed view of the driveline clutch 12 is shown in cross section in FIG. 2. The input shaft 22 of the clutch 12 is supported in bearings in the clutch housing 20. The input shaft 22 carries a drum 24 which supports a multitude of clutch outer disks, fixed against rotation relative to the drum 24. Clutch inner disks are interleaved between the clutch outer disks and are connected, fixed against rotation, with a set of gear teeth 26 of a drum-shaped hub 28 on the output shaft 30 of the clutch 12. A needle bearing 32 is arranged between the input shaft 22 and the output shaft 30. The output shaft 30 is supported in a bearing 34 in the housing 36 of a synchronized multi-speed gearbox 14 which is attached to a flange on the clutch housing 20. It is connected by a spline 35 to the gearbox input shaft 36.

The input shaft 22 of the clutch 12 contains a hydraulic line 40 through which hydraulic fluid can flow to a cylinder chamber 42 of the clutch drum 24, in order to actuate a clutch piston 44. The clutch piston 44 operates against the force of return springs 46 to force the clutch disks against each other and to establish power transmission between the input shaft 22 and the output shaft 30.

The input shaft 22 also contains a coolant line 48 through which coolant, for example cooling oil, can be supplied to the interior 50 of the hub 28. From there the cooling oil is impelled by centrifugal force through radial bores in the drum-shaped hub 28 radially outward to the linings of the clutch disks. The linings are provided with generally radial grooves that permit a through flow of cooling oil. The cooling oil carries away the heat generated in the clutch 12 as indicated by the arrow 52. Having absorbed this heat, the cooling oil can be thrown off through openings in the outer contour of the clutch drum 24 and carried to a cooler, not shown.

Figure 3:
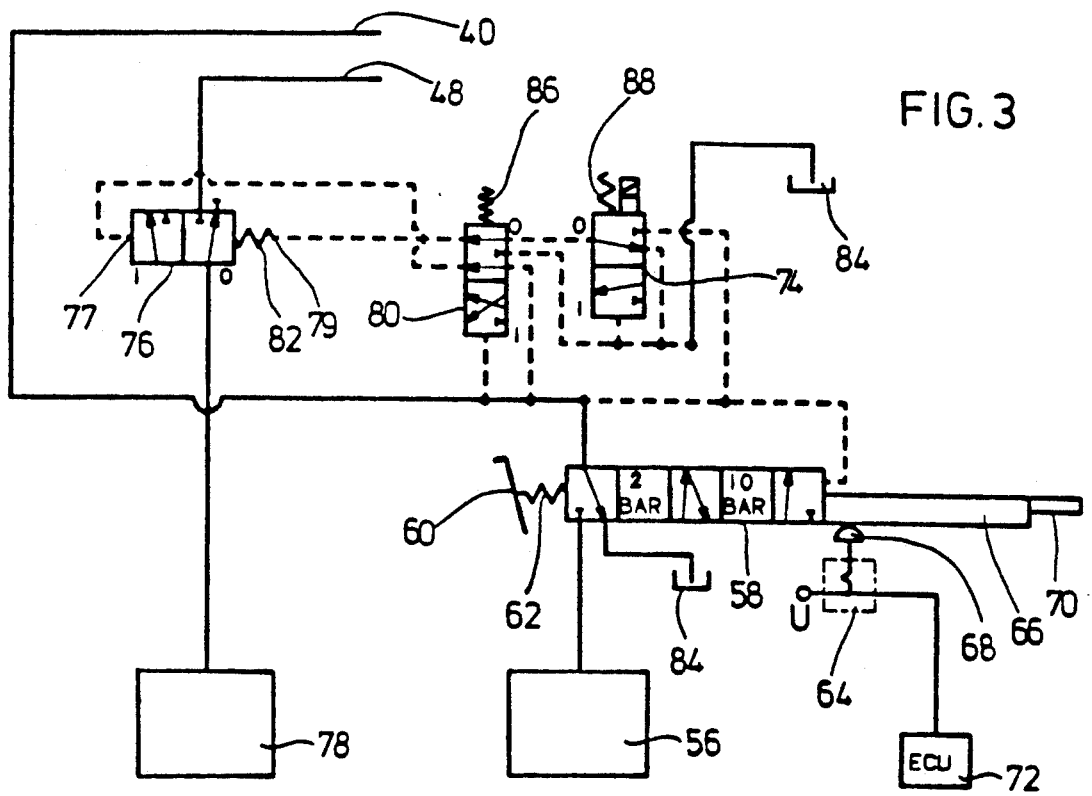
FIGS. 3 through 8 show a schematic diagram of a coolant flow control circuit according to the invention in various control positions.

The flow of fluid in the hydraulic line 40 and in the coolant line 48 is controlled by a control arrangement that is schematically illustrated in FIGS. 3 through 8. Referring to FIG. 3, the hydraulic system pressure is generated by a pressure source 56, usually a gear pump with a following pressure control valve, that maintains the system pressure at a constant level. The pressure source 56 is connected through a clutch valve 58 with the hydraulic line 40. The clutch valve 58 controls the opening (disengagement) and closing (engagement) of the clutch 12. It can be operated through a clutch pedal 60 against the force of a spring 62 by the operator. The clutch valve 58 permits the operator to continuously vary the pressure at the clutch piston 44 from zero to the nominal pressure (for example, 12 Bar), for example, to perform the process of starting the vehicle.

The clutch valve 58 is connected with a pressure-sensitive limit switch 64 that opens or closes a contact upon exceeding or falling below a certain valve position that corresponds to a trigger pressure (for example, 10 Bar) at which the clutch is engaged. To this end, the clutch valve 58 is connected to a cam rod 66 that acts together with a sensor 68 of the limit switch 64. Whenever the clutch valve 58 is in a position in which the trigger pressure is exceeded, the sensor 68 will be in the region of a receding edge 70 of the cam rod 66 and will open a contact in the limit switch 64, as shown in FIGS. 5 and 6. If the trigger pressure is not reached, then the contact in the limit switch 64 remains closed, as shown in FIGS. 3, 4, 7, and 8.

Another device could be used in place of the limit switch, for example, a pressure switch inserted directly into the hydraulic line 40 which performs a switching operation when the trigger pressure is exceeded or underrun.

The control signal produced due to opening or closing of the limit switch 64 is transmitted to an electronic control unit (or ECU) 72. When the limit switch 64 opens the contact during clutch engagement, the control unit 72 transmits a control voltage to the electromagnetic valve 74 for a first predetermined time interval T1 (for example 15 seconds). On the other hand, when the limit switch 64 closes during clutch disengagement, the control unit 72 transmits a control voltage to the electromagnetic valve 74 for a second predetermined time interval T2 (for example 1.5 seconds), as will be described in greater detail.

The electromagnetic valve 74 is controlled by the electronic control unit 72 and is a valve which connects its outlet with the sump 84 when it is de-energized (position O), or with the clutch piston pressure in the hydraulic line 40 when it is energized (position ı ). One end face of the electromagnetic valve 74 is loaded by a spring 88, while the other end face is connected to the sump 84.

A hydro-mechanical valve 76 is used as a coolant control valve through which a connection can be opened (position ı ) or closed (position O) for the flow of coolant from a coolant control 78 to a coolant line 48. A pilot chamber 77, 79 is provided in each of the end faces of the valve 76 to which control pressure is transmitted from a pilot valve 80. One end face of valve 76 also is loaded by a compression spring 82 to bias the valve closed, i.e., against the pressure in the left pilot chamber 77. The force of the compression spring 82 corresponds to a pressure of 2 Bar, and supplements the pressure in the right pilot chamber 79.

The pilot valve 80 is a hydro-mechanical valve each of whose two outlets is connected to one of the pilot chambers 77, 79 of the coolant control valve 76. The pilot valve 80 connects its two outlets with the clutch pressure in the hydraulic line 40, with a sump 84 or with the outlet of the electromagnetic valve 74. One end face of the pilot valve 80 is loaded by a spring 86 with a spring force that corresponds to a pressure of 10 Bar. The other end face is loaded by the clutch piston pressure in the hydraulic line 40.

Operation

Referring to FIGS. 3 through 9, operation of the control circuit is as follows:

Normally the initial condition will be with the clutch 12 disengaged, that is, the clutch pedal 60 is depressed. The operating pressure then is blocked by the clutch valve 58 and the valves 76 and 80, which control the coolant, are both in position O due to the springs 82 and 86. The electromagnetic valve 74 is de-energized and is also retained in its position O by the spring 88.

During the vehicle start-up process, the clutch 12 is engaged by increasing the pressure on the clutch piston 44 by slowly opening the clutch valve 58 continuously from 0 Bar to the system pressure S (here 12 Bar), as shown in FIG. 9. Until the pressure on the clutch piston 44 reaches a lower threshold value A (here 2 Bar), all valves remain in their initial position O, since the pressure in the hydraulic line 40 cannot overcome the force of the springs 82 and 88. The coolant flow remains blocked. The lower threshold value A corresponds approximately to the pressure that is necessary to close the stack of clutch disks of the clutch 12 against the spring force of the return spring 46 of the clutch piston 44 and the friction of the piston seals enough to initiate the slippage phase of the clutch 12.

Figure 4:
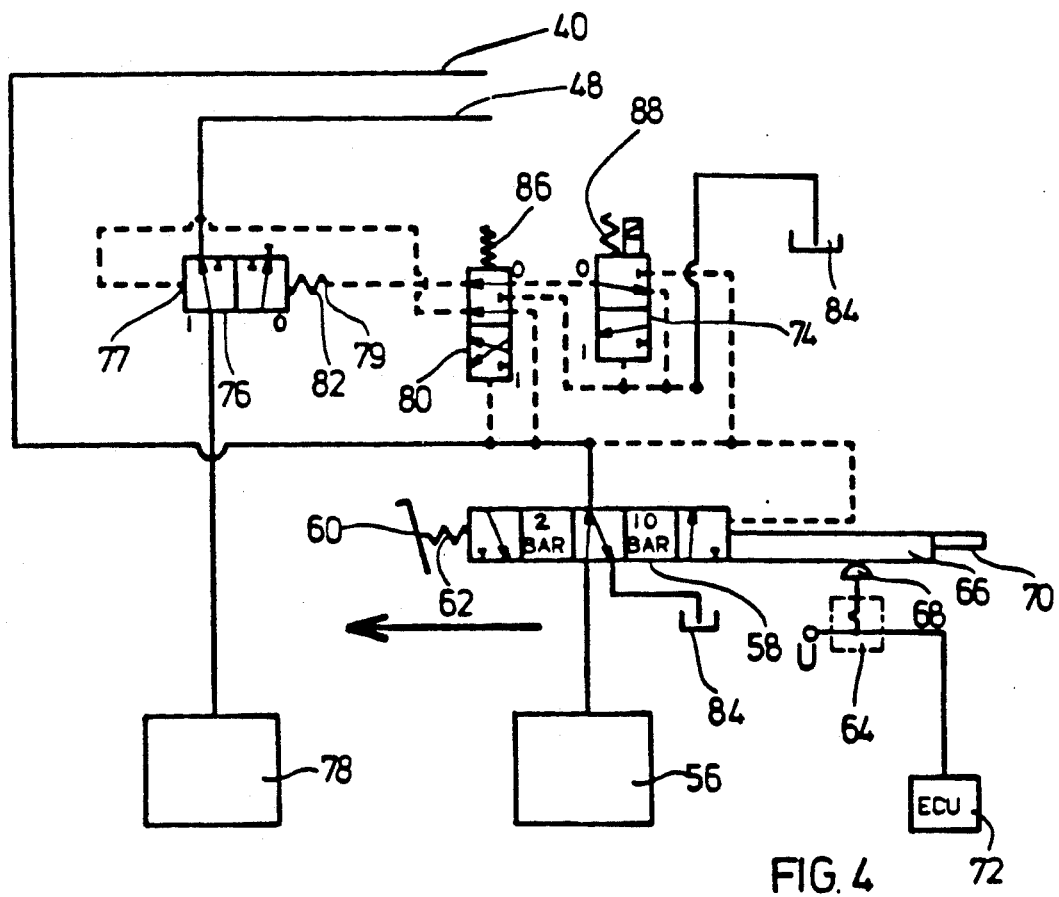
Figure 5:
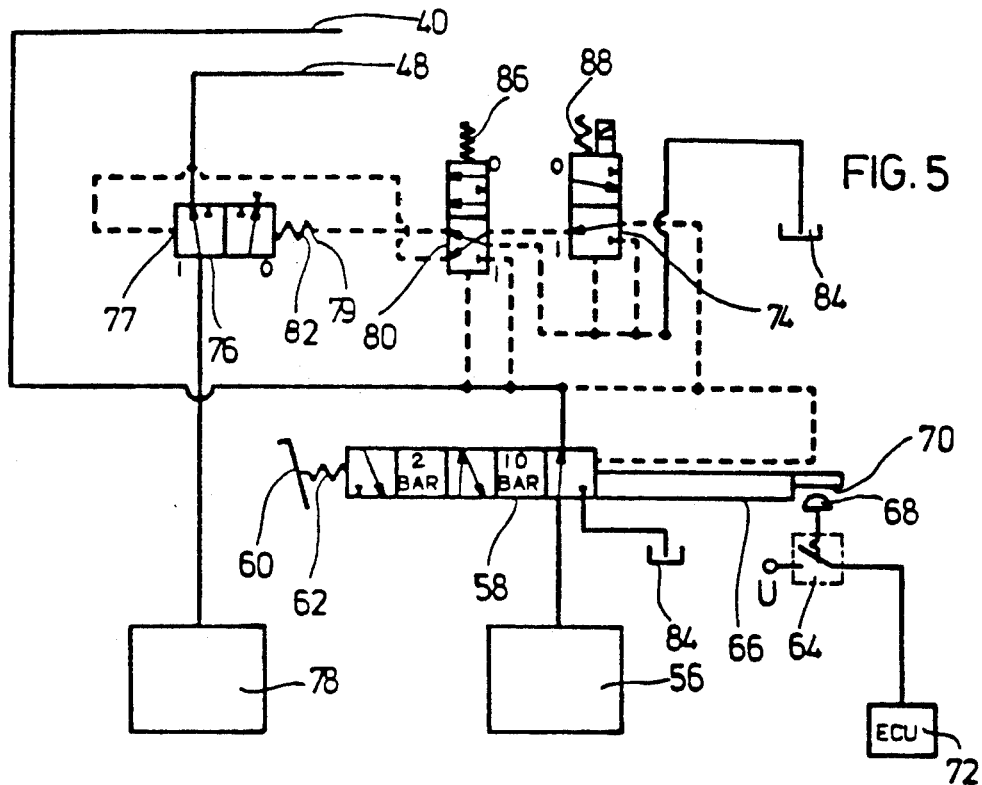
Figure 6:
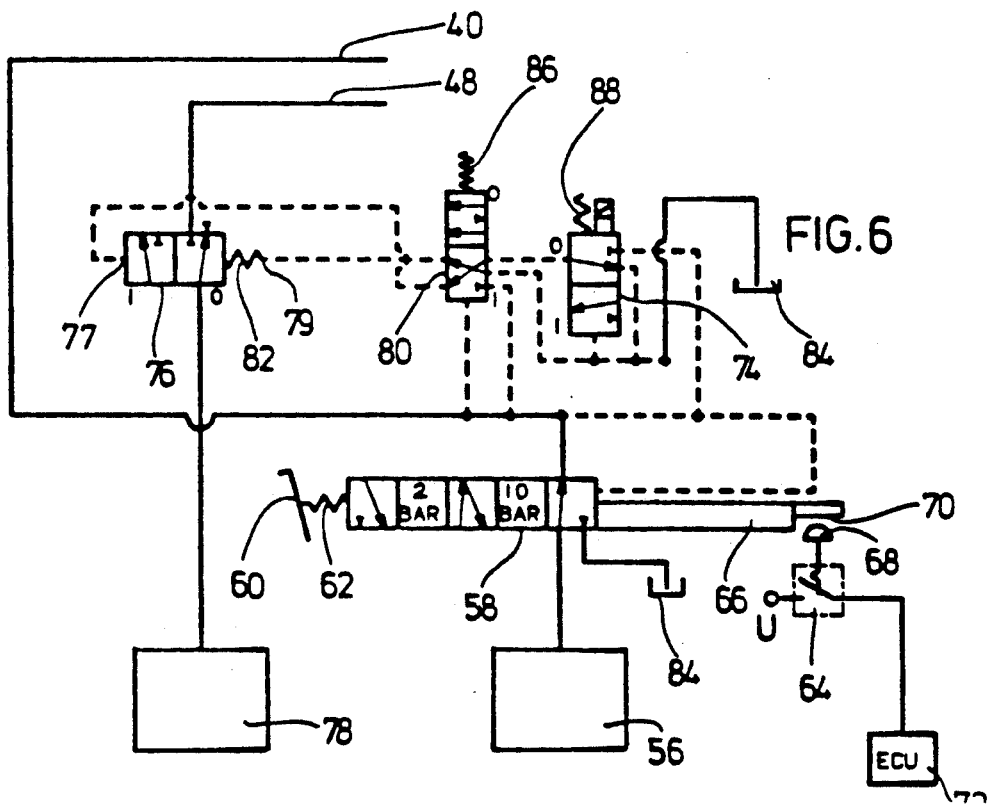

As the pressure in the hydraulic line 40 increases due to continued movement of the clutch valve 58 to the left (as seen in FIGS. 1 through 8), the clutch disks come into frictional contact with each other and generate heat. The first pilot chamber 77 of the coolant control valve 76 is connected through the pilot valve 80 to the pressure in the hydraulic line 40. This pressure overcomes the force of the spring 82 and the valve 76 moves from position O to position ι (FIG. 4). The valve 76 is now open and coolant can flow from the coolant source 78 to the stack of disks of the clutch 12 to remove the heat generated there.

The pilot valve 80 remains in position O, since the control connection requires a pressure greater than 10 Bar to overcome the force of the spring 86. The electromagnetic valve 74 remains de-energized and remains in position O. As long as the clutch pressure in the hydraulic line 40 remains between the lower threshold value A (here 2 Bar) and an upper threshold value B (here 10 Bar), the coolant flow continues.

If the clutch valve 58 is moved further to the left, and the pressure in the hydraulic line 40 reaches the upper threshold value B of 10 Bar (FIG. 5) (at which point the clutch disks are fully compressed and the slippage phase has ended), then the force of the control pressure applied to the pilot valve 80 overcomes the force of the spring 86 and moves the pilot valve into its position ι . The control pressure in the first pilot chamber 77, which holds the valve 76 in its position ι , then would bleed off to the sump 84, and the valve 76 would be moved into its position O under the force of the spring 82, blocking the coolant flow.

However, simultaneously with the movement of the pilot valve 80 from its position O to its position ι , the sensor 68 of the limit switch 64 passes the edge 70, so that the limit switch 64 opens and delivers an impulse to the electronic control unit 72. The ECU 72 then actuates the electromagnetic valve 74 for a time interval of 15 seconds, starting when the upper threshold value B is crossed. The valve 76 moves to its position ι and opens the pilot valve 80 to the pressure of the hydraulic line 40, which pressurizes the first pilot chamber 77 of the coolant control valve 76 and thereby prevents this valve 76 from moving into its closed position O. Hence the coolant flow is maintained as long as the electromagnetic valve 74 is actuated. Since the electronic control unit 72 actuates the electromagnetic valve 74 for a first predetermined time interval T1 (here 15 seconds), the clutch 12 is provided with follow-on cooling flow during this time interval T1, and is cooled to its initial temperature.

Once the first predetermined time interval T1 of 15 seconds ends, the electronic control unit 72 switches off the electromagnetic valve 74, which is returned to its rest position O by the force of the spring 88 (FIG. 6). Now the control pressure in the first pilot chamber 77 of the coolant control valve 76 is bled off to the sump 84 through the pilot valve 80 and the electromagnetic valve 74. The valve 76 returns to its position O and blocks the coolant flow to the clutch 12.

Upon rapid disengagement of the clutch 12, for example, to actuate a synchronized, positive locking shifting device in the multi-speed gearbox 36 and to perform a gear shift, the amount of heat developed in the clutch 12 is so low that coolant flow is not required. Indeed, coolant flow in the clutch 12 during actuation of the multi-speed gearbox 36 is undesirable, since coolant remaining between the clutch disks after separation increases the friction torque of the clutch 12 and puts a load on the synchronizing rings of the multi-speed gearbox 36, which reduces their endurance life, and impairs the shifting comfort (shifting force and time) of the gearbox.

It therefore is desirable that no coolant reach the clutch 12 itself during the entire rapid disengagement process, since the coolant contained in the clutch 12 can be expelled and the friction torque decreased to its minimal value only after a corresponding time delay. On the other hand, cooling should occur when the disengagement process is not performed rapidly, but exceeds a second predetermined time interval T2.

Figure 7:
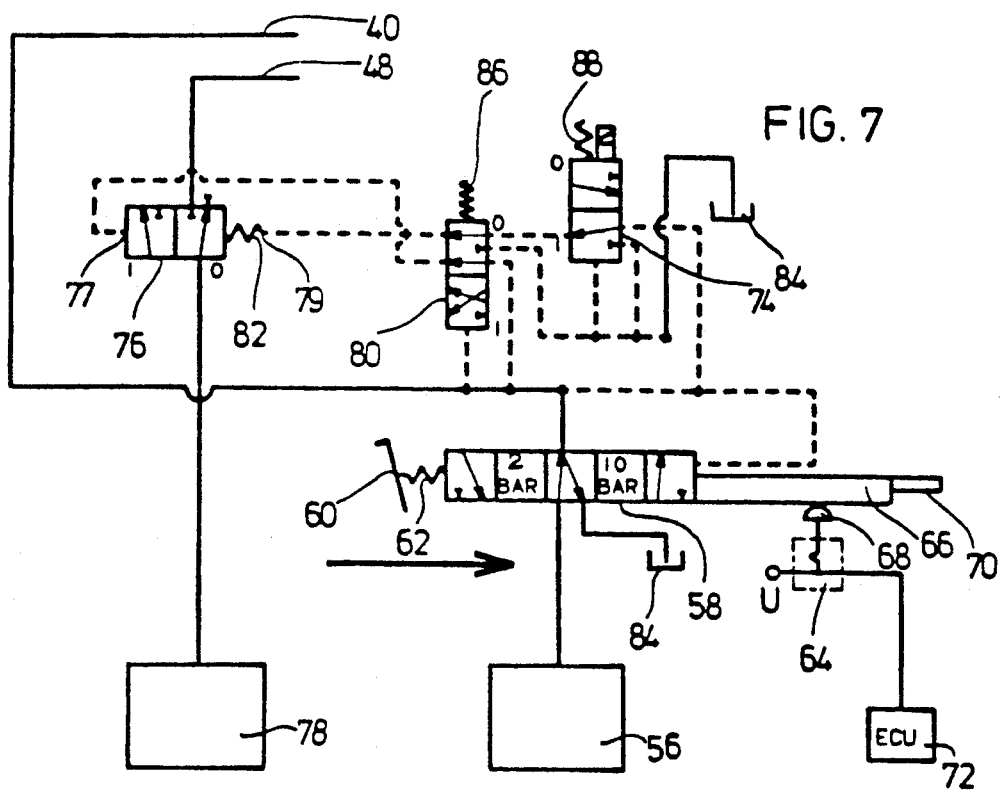
Figure 8:
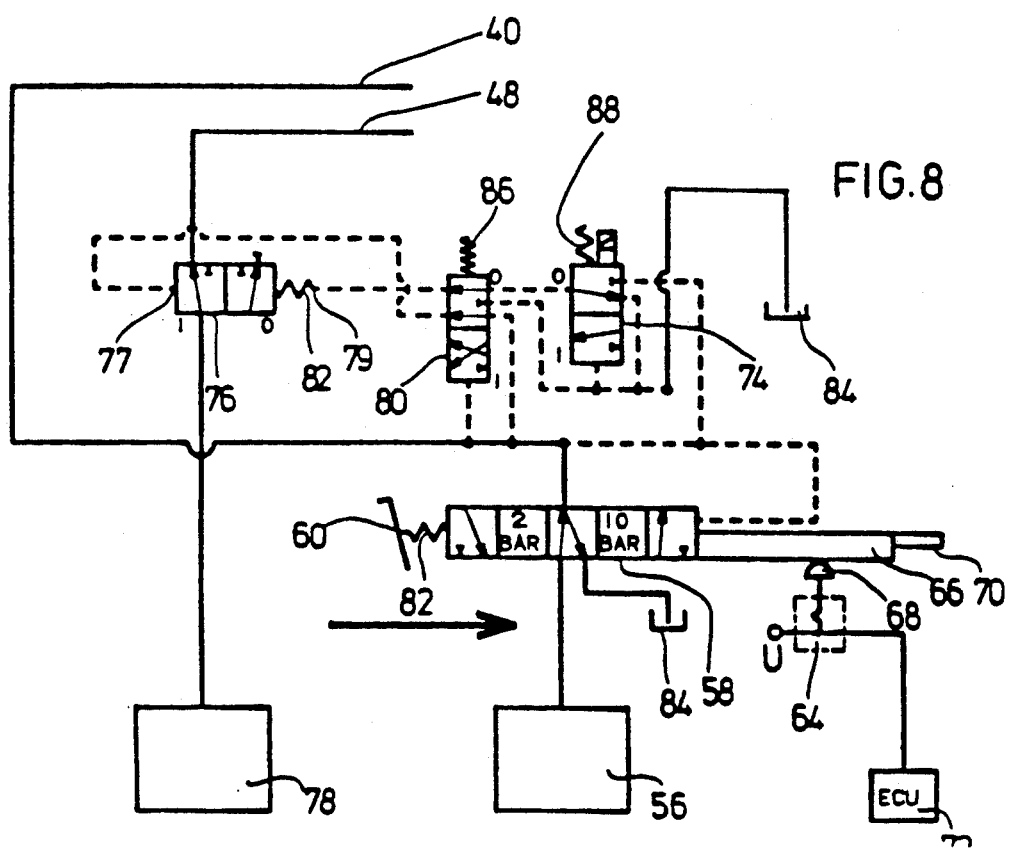

To this end, the electronic control unit 72 is arranged so that upon closing of the contacts of the limit switch 64, the electromagnetic valve 74 is actuated for a predetermined second time interval T2 (here 1.5 seconds). The contacts of the limit switch 64 are closed as soon as the pressure in the hydraulic line 40 falls below the upper threshold upon movement of the clutch valve 58 for disengagement (FIG. 7). The electromagnetic valve 74 moves to its position ι . Simultaneously, the pilot valve 80 is moved to its position O, since the pressure in the hydraulic line 40 is no longer sufficient to overcome the force of the spring 86. At that time the pressure in the hydraulic line 40 is transmitted to both pilot chambers 77, 79 of the coolant control valve 76. Since the control cross sections of the valve 76 are equally large and the pressure forces are balanced. the spring 82 forces the valve 76 into its position O. The coolant flow remains blocked.

During rapid disengagement of clutch, in which the pressure in the hydraulic line 40 is reduced from 10 Bar to 2 Bar within the second time interval T2, the clutch 12 remains free of coolant. In any case, below 2 Bar the coolant flow is cut off by the spring 82 of the coolant control valve 76. Synchronized shifting of the multi-speed gearbox 36 can now proceed under optimum conditions.

If the disengagement process takes longer than 1.5 seconds (i.e., if the pressure in the hydraulic line 40 remains between 10 and 2 Bar longer than 1.5 seconds), the electronic control unit deactivates the electromagnetic valve 74 (FIG. 8), and the valve 74 returns to its position O. The pilot valve 80 is in the position O, since the pressure in the hydraulic line 40 is lower than 10 Bar. The pilot chamber 79 on the spring side of the coolant control valve 76 then is connected to the sump upon the return of the valve 74, and is connected through the pilot valve 80 and the valve 74, while the opposite first pilot chamber of the valve 76 remains under the pressure in the hydraulic line. The valve 76 therefore moves to its position :, and coolant flow is activated.

If the electrical or electronic components have failed completely or partially, or if the vehicle is operated without an electrical supply (e.g., without a battery), then the hydromechanical valves 76, 80 provide the assurance that the clutch is cooled in any case between the lower threshold value A (2 Bar) and the upper threshold value B (10 Bar), that is, in the slippage phase, avoiding overheating. By the same token, these valves ensure that the clutch does not receive any coolant in the disengaged condition, thus providing easy shifting of the gearbox.

FIG. 9 illustrates a diagram of the variation with time of the clutch pressure in the hydraulic line 40 and of the coolant flow through the control valve 76 during the various engagement and disengagement processes. A first segment shows the performance during a normal engagement and a rapid disengagement process. The second segment shows the performance during a slow disengagement and a third segment shows an engagement and a disengagement process during which the electrical components have failed. FIG. 9 refers to control position according to the FIGS. 3 through 8.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A coolant flow control system for a disk clutch, comprising:
   a. a source of coolant;
   b. coolant valve means for selectively connecting said source of coolant to the clutch;
   c. sensor means for detecting when the clutch is in the process of being engaged and disengaged, and providing a signal representative thereof;
   d. control means for receiving said signal from said sensor means and for activating said coolant valve means based on said signal to:
      i. provide coolant to said clutch for a first predetermined time interval immediately following the engagement process; and
      ii. provide coolant to said clutch during the disengagement process only if the disengagement process lasts for more than a second predetermined time interval.

2. The control system according to claim 1, wherein said clutch is controlled by pressure in a piston chamber, said sensor means senses the clutch piston pressure, and wherein said control means starts measuring said second time interval when said clutch piston pressure decreases below a predetermined upper threshold pressure which is less than the pressure required to fully engage the clutch.

3. The control system of claim 2, wherein said control means starts measuring treats said disengagement process as being in effect from the time when said clutch piston pressure decreases below said upper threshold pressure until said clutch piston pressure again exceeds said upper threshold or decreases below a predetermined lower threshold pressure which is approximately the pressure at which the clutch is fully disengaged.

4. The control system of claim 2, wherein said coolant valve means comprises:
   a. a first pilot and spring controlled hydromechanical valve biased to a rest position having a first pilot chamber the pressure in which can move said first valve from said rest position to a second position when said pressure exceeds said lower threshold pressure; and
   b. a second pilot and spring controlled hydromechanical valve biased to a rest position and having a first pilot chamber the pressure in which move said second valve from said rest position to a second position when said pressure exceeds said upper threshold value, said second valve connecting said clutch piston pressure to said first pilot of said first valve when said second valve is in said rest position.

5. The control means of claim 4, further comprising a reservoir for pressure medium in said clutch piston chamber and wherein said second valve connects said first pilot chamber of said first valve to said reservoir when said second valve is in its second position.

6. The control system of claim 5, wherein said control valve means further comprises an electromagnetic control valve having an outlet connected to said second valve and an inlet connect to said reservoir when said control valve is in its rest position and said clutch piston pressure when said control valve is in its energized position.

7. The control system of claim 6, wherein said control means comprises and programmed electronic control unit which control said electromagnetic control valve by transmitting control signals to said electromagnetic control valve when signals from said sensor means indicate said clutch piston pressure is between or exceeds said upper and lower threshold values for said time intervals.

8. The control system of claim 1, wherein said sensor means comprises a limit switch which interacts with said clutch to detect the position of said clutch and that switches states when the clutch exceeds or goes below a predetermined position.

9. The control system of claim 1, wherein said first time interval is between about 5 to 45 seconds, and said second time interval is between about 0.5 to 3.0 seconds.

10. The control system of claim 9, wherein said first time interval is about 15 seconds and said second time interval is about 1.5 seconds.

* * * * *